July 16, 1968  M. MECKLER  3,393,130
PELTIER EFFECT CONCENTRIC STILL
Filed July 9, 1964  2 Sheets-Sheet 1

MILTON MECKLER,
INVENTOR.

BY HIS ATTORNEYS
Spensley & Horn.

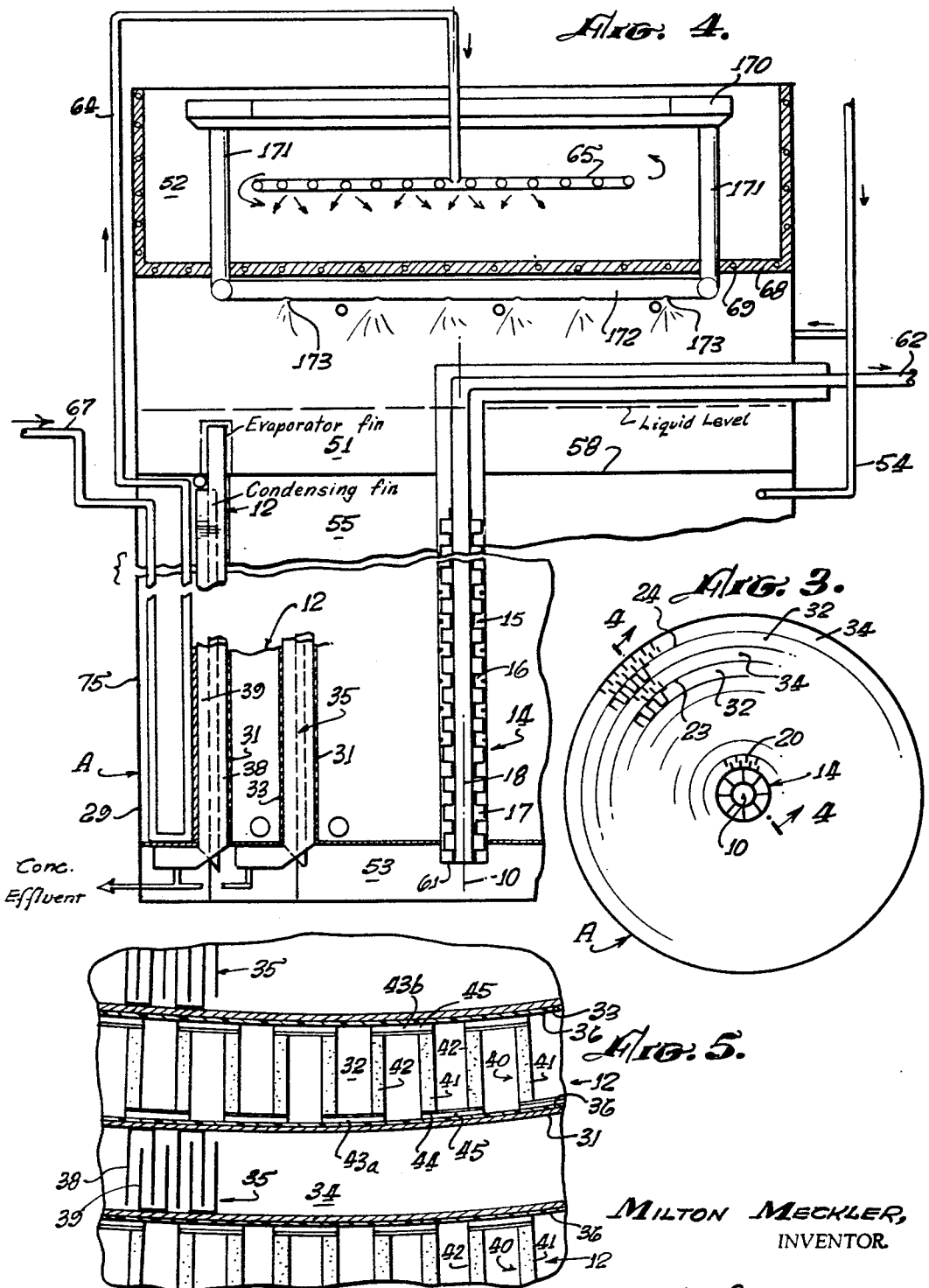

United States Patent Office 3,393,130
Patented July 16, 1968

3,393,130
PELTIER EFFECT CONCENTRIC STILL
Milton Meckler, 2013 Corning St.,
Los Angeles, Calif. 90034
Filed July 9, 1964, Ser. No. 381,588
16 Claims. (Cl. 202—187)

ABSTRACT OF THE DISCLOSURE

A thermo-electric diffusion still including a concentric series of sections which sections are closely spaced to define annular diffusion spaces therebetween. A series of thermo-electric elements are positioned within such sections providing heated and cooled surfaces, respectively, on opposite sides of the section as well as facing each other across the spaces to evaporate and condense a feed fluid. Means are provided for collecting condensate from the opposite surface of each of the sections.

---

This invention relates to a method and apparatus for separation of dissimilar materials in a fluid state and more particularly to a method and apparatus for conversion of non-potable to potable water by thermoelectric diffusion.

The efficient conversion of salt water or brackish water to potable water is becoming increasingly important in supplying the water requirements of the growing population. Various methods and apparatus have been devised for the conversion of salt water to potable water to render it fit for human consumption or irrigation by evaporation and recondensation. However, at the present state of the art such apparatus is generally bulky and complex, necessitating a multiplicity of pipes and headers and requiring a large heat transfer area for the evaporation of salt water. In present distillation or evaporation processes for the recovery of fresh water from saline waters, the efficiency of the processes heretofore known to the art is low and renders the cost of the production of fresh water sufficiently high as to be commercially impractical. In producing potable water from saline or brackish water the energy requirement depends upon the process selected for the conversion. Distillation processes are primarily the only ones which have been proven on a commercial scale up to the present time for saline solutions as concentrated as sea water. Variations in distillation processes are due primarily to the use of different types of evaporators, to diffferent method of utilizing energy, and to the way in which heat is transferred. For example, processes have been developed using a boiling type evaporator or flash type, a submerged tube or film type, a stationary surface, or rotating evaporating surface, forced circulation or natural convection, multiple effect of vapor compression, heat transfer through metal walls or by the use of imissible liquids, and so forth. Many combinations of these variations are possible.

The distillation process could be more efficient at higher temperatures which are practical, if not for the scaling problem. Formation of mineral scale on heat exchange surfaces is of two general types, namely, due to the breakdown of bicarbonate to the carbonate ion and $CO_2$, and due to the concentration ratio between feed and effluent which causes the solubility limit of dissolved components capable of scale formation to become exceeded at the operating temperature, and scale forming compounds are precipitated out on evaporating surfaces. Principal minerals of scale are magnesium and calcium which form $CaCO_3$ and $CaSO_4$ as the primary sources along with $Mg(OH)_2$.

Accordingly, it is an object of the present invention to provide a thermodynamically improved apparatus for the separation of two dissimilar materials in fluid form.

It is another object of the present invention to provide an improved method and apparatus for the conversion of non-potable water to potable water.

It is a further object of the present invention to provide such a conversion method and apparatus wherein the apparatus is compact, simple in construction and operation, and efficient.

Yet another object of the present invention is to provide a method of converting brackish or saline water to potable water which process is efficient to a degree not obtainable by methods of the prior art.

A further object of the present invention is to provide a method of apparatus for conversion of non-potable to potable water which method and apparatus are sufficiently efficient and economical in operation as to make such conversion economically practicable.

A further object of the present invention is to provide a method whereby sewage may be treated and fresh water reclaimed in inland populous areas where fresh water supplies are scarce.

Another object of the present invention is to provide a means of economically reclaiming water where only solar cell DC power is available and low weight apparatus of high efficiency is essential.

Yet another object of the present invention is to provide such conversion apparatus which has low power input requirements and operates at sufficiently high pressure as to minimize latent heat energy requirements.

A still further object is to provide an improved method of salt water conversion which permits controlled degassing of the vapor without extensive vacuum purging.

A further object of the present invention is to provide a conversion apparatus which operates at temperatures below boiling and minimizes liquid carryover problems.

A still further object of the present invention is to provide an improved method and apparatus for salt water conversion which makes such conversion possible in remote regions or regions in which unlimited power supplies are not available.

A still further object of the present invention is to provide a saline conversion unit of the type described which can be employed where available saline water at high pressure can be used directly without need for pressurization.

A further object of this invention is to provide a means whereby diffusion of water vapor can take place at temperatures above 300° F. with relatively high concentration ratios without formation of scale on evaporating surfaces.

Yet another object of the present invention is to provide a method and apparatus for conversion of non-potable to potable water which can be economically arranged to utilize DC power by direct energy conversion.

The apparatus of the present invention comprises in general terms a thermoelectric diffusion still which includes a series of concentric endless walled, sections which sections are closely spaced and between which a series of thermoelectric elements are positioned as heat pumps. Means are provided for the passage of distillate along the radially outer surface of each of the concentric sections. Water vapor is diffused from the thin film of liquid passing along the outer surface of each section, across a narrow gap or endless space to the inner surface of the next adjacent concentric section which serves as a condensing surface. The heat for the diffusion of the water vapor at a predetermined constant temperature is provided by thermoelectric heat pumping from the first concentric section relative to the axis of the apparatus in series outward radially to the most distant section from the axis. Diffusing water vapor is thus evaporated and condensed respectively from one section to another requiring only the current necessary to pass the heat flux from the inner to the outer surface. Means are provided for removing the distillate from the inner surface of the concentric sections and the effluent water from the outer surface of the respective concentric sections.

For most distillation processes used in recovery of fresh water from saline waters the energy requirement bears no direct relationship to the latent heat of vaporization. In these systems extensive heat transfer surface must be provided to largely recover the heat to vaporize this water if the energy requirement is to be maintained within practical and commercially acceptable limits.

The present invention is a method and apparatus for conversion of non-potable to potable water which differs in principle from known distillation process. The energy requirements of the present invention which utilizes a thermoelectric diffusion still in accordance with the present invention is a function of the latent heat of vaporization of water.

In accordance with the present invention rather than providing enormous surface, thereby equipment bulk, for separate evaporation and condenser functions, diffusion still heat transfer surface requirements are minimized by a compact concentric design which reduces both equipment and maintenance costs while still permitting heat economy through temperature exchange and flashing techniques between incoming feed and outgoing distillate and effluent streams.

The present invention serves to reduce the cost of recovery of fresh from saline water by improved thermodynamic efficiency. The direct use of electrical energy which is available at any required temperature level offers advantages over the use of fossil fuels whose utilization efficiency is a direct function of operating temperature levels. The present invention promotes diffusion by selected operation which suppresses boiling and attendant scaling and liquid carryover problems and achieves high mass transfer rates through greater proximity of evaporative and condensing surfaces.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIGURE 3 is a plan view in section taken through the diffusion still along line 3—3 of FIGURE 1;

FIGURE 4 is a sectional view in elevation taken along line 4—4 of FIGURE 3; and

FIGURE 5 is an enlarged partial schematic view of the chamber areas of the still.

Figure 1:
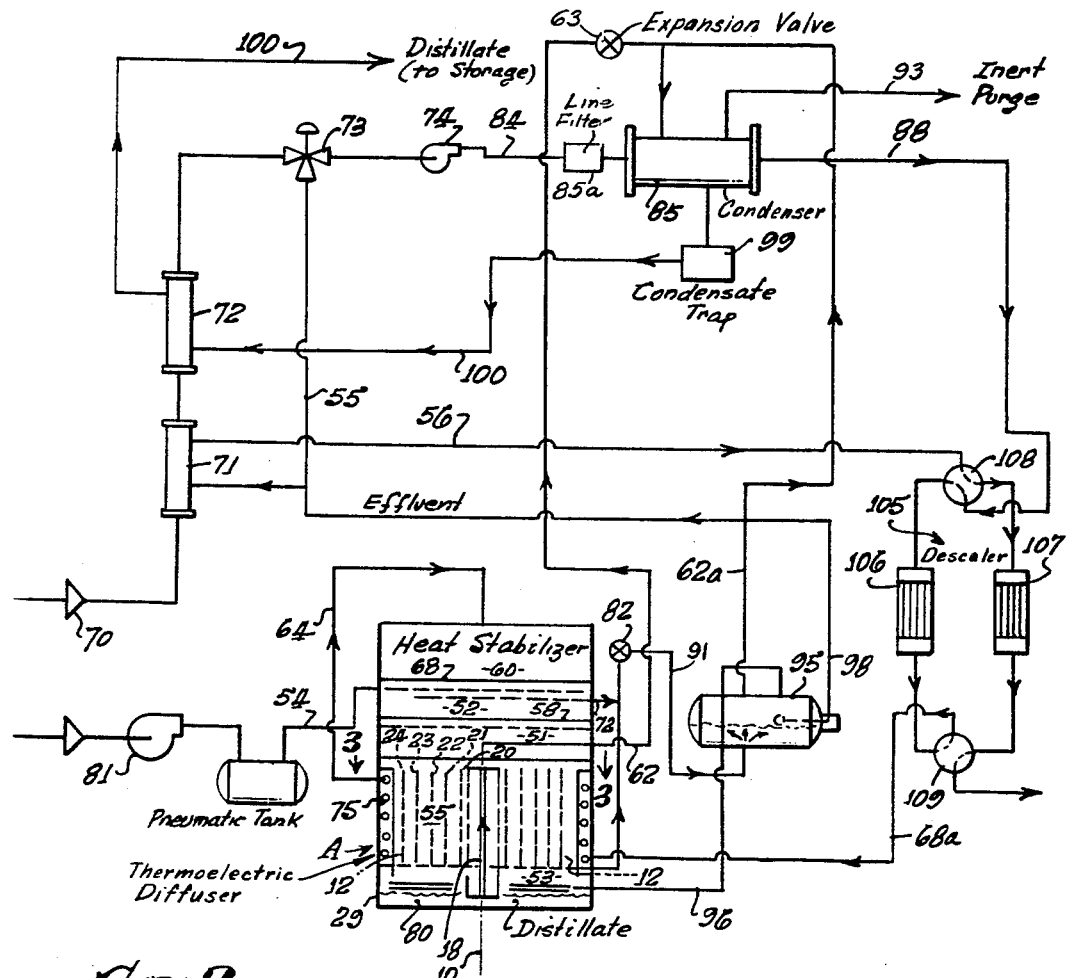
FIGURE 1 is a flow diagram of a presently preferred embodiment of the present invention.

Although not limited thereto the present invention is particularly adapted to the conversion of saline water to potable water and is therefore described in connection therewith throughout the following description of a presently preferred apparatus and its method of operation. It will be understood that the concept and means of the present invention can be utilized to separate other materials of dissimilar nature. That is, rather than the distillation of saline water to produce potable water, the method and apparatus of the present inventon can obviously be used to separate a lighter fraction of fluid from a heavier feed fluid which feed fluid can be liquids of various compositions.

The present invention utilizes thermal or vapor diffusion or a combination thereof as the distillation process occurring between successive concentric shells in the apparatus. This diffusion process takes place at temperatures below the boiling point of the feed water and is a well-known phenomenon. Thus, by utilizing vapor diffusion a thin film of saline or brackish water, hereinafter termed feed water, is supplied to a surface which is at a predetermined pressure and temperature below the boiling point of water but at which the pressure maintained at the surface of the film is sufficient to provide an appreciable mass transfer of vapor from the surface of the water. That is, at any given pressure, provided the solution is maintained at a predetermined temperature which is below the boiling point of the solution. The present invention utilizes a second surface closely adjacent to the thin film of feed water which second surface is a condensing surface maintained at a temperature less than the temperature of the first surface, hereinafter termed the evaporating surface. By proper maintenance of the temperature of the evaporating surface and the lower temperature of the condensing surface together with the pressure and space therebetween, the present inventinon achieves a transfer of the water vapor from the first to the second surface where it is condensed as fresh water. Mass transfer which is the primary limiting or controlling factor in the diffusion still operation of the present inventon will vary directly in relation to the distance separating the evaporating and condensing surfaces. The rate of mass transfer under any given set of operating conditions will increase as this distance is decreased. A presently preferred distance, temperature differential, and operating pressure, is discussed hereinafter in connection with a presently preferred embodiment of the present invention.

In accordance with the present invention, in order to achieve the temperature differential between the evaporating surface and condensing surface of the apparatus, a thermo-electric heat pump is utilized. The use of thermoelectric elements for heat pumping is known to the art and is described in texts such as "Semiconductor Thermoelements and Thermo-electric Cooling" by A. F. Ioffe, Info Search, Ltd., 1957, and in various patents such as Patent No. 2,959,017 Yeoman, et al., "Heat Exchangers Employing Thermo-electric Elements for Heat Pumping," issued Nov. 9, 1960, and Patent No. 2,978,875, Lackey, et al., "Plural Stage Thermo-electric Heat Pump," issued Apr. 11, 1961. Briefly, a thermo-electric heat pump is a device utilizing Peltier phenomenon of heat absorption and heat dissipation at junctions between bodies having different thermomotive properties, which phenomenon occurs when electric current is passed through the bodies. A number of junctions are coupled and generally employed in a heat pump of this type, the couples being physically and electrically interconnected to form a thermo-electric array. The particular arrangement of thermo-electric elements employed in the present invention will be discussed more fully hereinafter in connection with the illustrative embodiment of the present invention. A thermo-electric element of the type employed in connection with the present invention typically comprises an N-type thermo-electric element and a P-type thermo-electric element. The N- and P-type components are made from semiconductor materials used in thermocouples. An example of N-type material is an alloy of bismuth-telluride and bismuth-selenide having a formula of 75% $Bi_2Te_3$–25% $Bi_2Se_3$. An example of P-type material is an alloy of bismuth-telluride and antimony-telluride having the formula 25% of $Bi_2Te_3$–75% $Sb_2Te_3$. Such elements are designated hereinafter as P-type or N-type to indicate the thermo-electric property thereof. The terms P and N have found wide usage in the semiconductor art, the former term designating material having an abundance of "holes" and the latter term designating material having an abundance of free "electrons."

Semiconductive components including antimony and bismuth have been found suitable for use respectively as P- and N-type materials. Such materials or the formation of thermo-electric pumping elements are not claimed as novel per se in the present invention, but an example will be set forth of the type of such element employed in connection with the apparatus of the present invention.

Referring now to the drawings, in FIGURE 1 a flow sheet of an illustrative embodiment of the present invention is shown with the thermo-electric vapor diffusion still portion thereof indicated in general as A. In FIGURES 3, 4 and 5, there are shown construction details of such a still in accordance with the present invention. Thus, referring to FIGURES 1 and 3 through 5, the apparatus in accordance with the present invention comprises a series of cylindrical shell sections 12 concentrically oriented about an axis designated as 10—10 in FIGURES 3 and 4. Positioned along this axis and having a length substantially equal to the length of the shell sections 12, there is positioned a starting column 14, which includes a heating element which by means of electrical current supplied from a power supply, not shown, is capable of achieving a temperature which can be regulated to a predetermined temperature to thus serve as an initial heat source for bringing the temperature of the starting column to the specified temperature. The starting column 14 is a heat pump unit in the form of an axial annular heater with thermo elements 16 in the annular portion 17 and a conduit 18 for the passage of fluid in the interior of the annulus. The resistance heating element 15 is imbedded resistance wire wound about the column at the exterior surface thereof and serves to raise the surface of the starter so that vaporization is initiated and apparatus and fluid temperatures are gradually increased through recirculation of deionized charge to a point where thermoelements 16 shall be capable of sustaining continuous operation with raw feed.

As shown in the drawings and particularly in FIGURES 3, 4, and 5, the diffusion section of the thermodiffusion still A is made up of a series of concentrically oriented cylindrical bodies as described hereinbefore positioned within a structural housing 29 capable of withstanding operating pressures as discussed hereinafter. Each of the bodies is in turn made up of an inner and outer shell of heat conductive structural material to define an inner and outer wall between which are positioned the thermo-electric heat pump units. That is, as shown in FIGURE 1, a series of equally spaced apart cylindrical bodies designated at 20, 21, 22, 23 and 24, in the figures are spaced about the central axis of the apparatus. Each of the cylinders in turn has an outer wall, 31, and an inner wall 33. An annular space 32 is then defined between the walls of the body and an annular space 34, is defined between the outer wall of one cylindrical body and the inner wall of the next outwardly spaced cylindrical body. It is within the annular space 34 defined between the outer wall of one cylinder and the inner wall of the next cylinder that the vapor diffusion takes place in accordance with the present invention. Between the inner and outer wall of each body the heat pumping units are positioned. Thus, the outer wall 31 of each cylinder is an evaporating surface and the inner wall 33 of each cylinder is a condensing surface. Within the annular space between successive bodies there is provided a plurality of interleaved fins as described more fully hereinafter but which are designated generally as 35 in FIGURE 5.

The inner surface of the walls between which the thermo-electric elements are positioned are insulated with a material of heat conducting type. That is, an electrically insulating but heat conducting type of insulation such as mica filled epoxy resin is positioned against the interior surfaces of the cylindrical body as shown by an insulating layer designated as 36 in FIGURE 5. Between these electrically insulated surfaces a heat pump in the form of a battery of thermo-electric couples 40 is arranged. Each thermo-electric couple comprises two arms 41 and 42 respectively, formed of different thermoelectric material. At one end thereof each arm is electrically connected to the other arm of the couple by means such as a jumper 43b. The thermo-electric couples are of known form in which each couple contains an arm of P-type material and an arm of N-type material whereby the passage of current through the couple will produce a Peltier effect resulting in one of the junctions being heated while the other junction is cooled. The cold junction is arranged in heat exchange relationship with the condensing wall of each cylindrical body and the hot junction is arranged in heat exchange relationship with the evaporating wall of each of the cylindrical bodies. As will be apparent, each battery of thermo-electric couples may be formed of a plurality of couples extending longitudinally of the tube or of a plurality of couples extending circumferentially of the tube.

In the illustrated embodiment of the invention the couples are arranged circumferentially with the P-type arm of one couple connected by a jumper plate 43b to the N-type arm of the adjacent couple. The last arm on each end of the circumferentially oriented heat pump has its free end connected to the conductor (not shown) by means of which the thermo-electric heat pump may be coupled to a source of direct current, either a battery, a DC generator, or rectifier. The alternate hot and cold thermocouple junctions 44 and 45, provide a hot junction, thermally connected to the evaporative wall 31, of each cylindrical body, 20 through 24 and a cold junction thermally connected to the condensing wall 33 of each of the bodies. When direct current is caused to flow from the P-elements of the N-elements, the interconnecting jumper means 43a becomes hot and the current flowing from N to P causes the jumper means 43b to become cold in accordance with the known Peltier effect. The difference in temperature between the evaporating surface of each of the cylindrical bodies and the condensing surface of the next adjacent cylindrical body is designated herein as ΔT.

Figure 2:
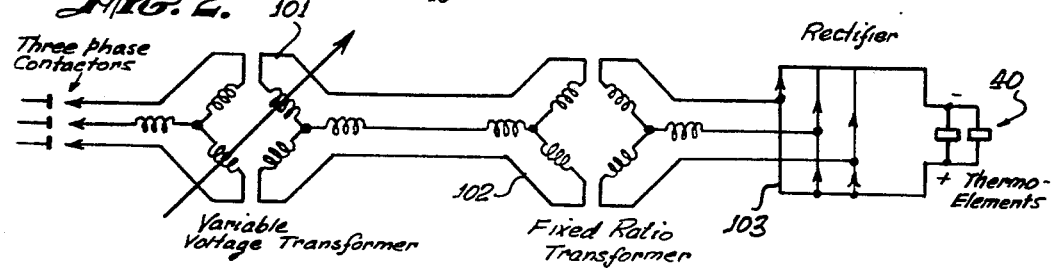
FIGURE 2 is an illustrative circuit diagram.

A circuit diagram showing an illustrative power supply to the thermoelements is shown in FIGURE 2. Electric power to the thermoelectric couples contained within the cylindrical shell bodies is similar for each thermoelectric couple 40 and one only is shown in connection with the power supply circuit. The power supplied to each couple must be direct current and should preferably have less than 5% ripple. In the illustrative circuit a variable voltage control transformer 101 is connected to a source of three-phase power (not shown). The transformer is driven to predetermined voltage requirements by a modulating control such that only the voltage required for a given load condition is imposed on the system. A fixed ratio transformer 102 is provided to adjust the voltage from the full-wave rectification of AC to a lower DC voltage required for operation of the thermoelements 40. The fixed ratio transformer serves to achieve the desired input voltage to a rectifier 103 when the variable transformer is positioned to its maximum voltage ratio. Thus, the fixed ratio transformer permits the full utilization of different rectifier input voltages when several separate units are combined to form one or more sections which are connected into one variable voltage transformer. The frequency employed in the apparatus of the present invention can be, for example, 60, 400 or 800 cycles; the required control and transformer sizes being reduced as greater frequencies are employed while the rectifier size remains the same. It is desirable to utilize 3 phase power supply because of the simplicity of rectifying to a suitable DC voltage. Similar circuitry can be employed for smaller apparatus in accordance with the present invention to utilize single phase power and controls. Use of direct energy converters which provide DC output would eliminate need for rectification.

As discussed hereinbefore, when a film of feed water is caused to pass over the evaporating surfaces a quantity of vapor will escape from the surface thereof and will be condensed on a cooler surface if the cooler surface is closely spaced adjacent to the surface of the water being passed over the evaporating surface. This will occur at a temperature below the boiling point of water and the amount of vapor driven from the water and condensed on the cooler evaporating surface will be dependent upon the temperature differential $\Delta T$, the space between the evaporating surface of the water and the condensing surface of the vapor, and the pressure between the surfaces. In order to maximize the evaporating and condensing surfaces and to minimize the spacing therebetween, a system of interleaved fins has been utilized in the presently preferred embodiment of the present invention. In addition to being interleaved the fins are perforated to present a surface which is fully wetted and which is conducive to film flow of feed water and promote high heat transfer rates at the condensing surface.

In thin film designs, at low feed rates, if there is insufficient wetting of the heated surfaces a low evaporation rate occurs. The use of perforated finned heat transfer surfaces in accordance with the present invention serves to provide optimum thermodynamic conditions for the wetting and spreading of the liquid feed on a heat transfer surface. The use of perforated surfaces generates high adhesion forces between the perforated solid and the molecules of the liquid.

When a thin film passes over a vertical surface and is disturbed by wave motions and ripples, significant increases in heat and mass transfer rates usually occur due primarily to vigorous bulk mixing by rippling, and in an increase in interfacial area caused by wave motion ripples.

Due to the fact that concentric annular chambers in close proximity are utilized for mass transfer of water vapor at relatively high pressures with respect to ambient, a relatively small pressure vessel is required for a large throughput. Only the exterior wall 29 of the apparatus need be structured as a pressure vessel since all intermediate annular chambers are operated at the same pressure and, therefore, no pressure differentials exist.

Thus, referring particularly to FIGURES 3 and 5 each of the fins is generally U-shaped in configuration with a length somewhat less than the radial distance between the adjoining surfaces defining each annular chamber 34. Each of the fins has a distance between the legs of the U which is approximately equal to twice the desired spacing between the evaporating and condensing surfaces. Thus, as shown in FIGURE 5, when the U-shaped fins are interleaved the distance between the leg of a fin attached to the evaporating surface and the next adjoining leg of the fin attached to the condensing surface is equal to the distance desired for the water vapor to travel. Accordingly, a continuous series of such U-shaped fins are affixed in staggered relationship circumferentially around the evaporating wall of a cylindrical body and the condensing wall of the next outwardly spaced cylindrical body. Within the annulus 34 there is thus provided a continuous circumferential series of alternately occurring evaporating and condensing fins. Each of the fins is formed of relatively thin heat conducting material such as aluminum brass, admiralty brass, or the like and the legs of each fin member are continuously perforated. By means of such perforations it has been found that water passed to the fins at the upper end thereof flows in a thin film configuration downwardly along the surface of the fin. By the use of interleaved surfaces each condensing surface faces two evaporating surfaces and vice-versa. The evaporating fins are designated generally as 38 while the condensing fins are designated as 39. In the presently preferred embodiment the fins are spaced to obtain a $\frac{1}{16}$ inch diffusion gap.

The shells containing the thermo elements with the fins positioned between shells are enclosed within a distillation portion 55 of the still housing 29. The still housing 29 includes also a controlled degassing section 51, a heat stabilization portion 52 and a distillate chamber 53 in the illustrative embodiment. The entire still housing 29 is constructed to withstand appreciable interior pressures, such as 500 p.s.i.a. in the illustrative embodiment. The entire housing is maintained at the operating chamber pressure by means of a compressed air line 54. The interior pressure of the still housing can also be maintained by the use of pressurized gases such as $CO_2$ or $N_2$ or combinations thereof. The shell sections are disposed within the still section 55 as discussed hereinbefore. Both the evaporating 38 and condensing 39 fins are in communication with the distillate chamber and with the evaporating fins 38 in communication with the degassing section 51. Thus, a fluid tight partition 58 divides the degassing section 51 from the still section 55 and forms the upper wall of the still section. The evaporating fins 38 protrude into the degassing section where feed water accumulates above the partition 58. Due to gravity feed water is conducted down the evaporating fins 38 and through the partition 58 to progress down the evaporating fins in thin film quantity flow. At the lower end of the fins is the distillate chamber 53 into which the distillate flows from the condensing fins 39. The level of distillate collected in the distillate chamber is above the lower end of the starting column 14 such that the lower open end 61 of the starting column 14 is immersed in the distillate and due to the pressure upon the distillate surface the distillate is forced up the starting column and from the still 55 through the distillate outlet line 62.

The heat stabilizing section 52 provides means for uniformly mixing the preheated feed water which enters the still through the feed water inlet line 64 having previously been preheated as discussed hereinafter. The heat stabilizing section assures that the feed water is conducted to the evaporating fins at the maximum uniform temperature. After being conducted into the still housing 29 through inlet line 64 the feed water is fed uniformly into the section 52 by means of a sparger header 65 which distributes the feed water in a swirling manner. The heat stabilizing section 52 is separated from the degassing section 51 by a partition 68 upon which the feed water accumulates. Heating means such as imbedded electrical resistance wires 69 are imbedded in the partition 68 and side walls to maintain the temperature of the feed water. Means are provided for passing the feed water from the heat stabilizing section to the degassing section. In the illustrative embodiment the distribution means includes a trough-like member 170 into which the feed water passes as the water level reaches the height of the trough, such that the hotter level of water is passed from the section 52. The feed water then progresses down standpipes 171 to a spray header 172 which has a plurality of spray heads 173 from which the feed water is sprayed into the degassing section. Spraying of the heated water allows accumulated gases to be expelled from the feed water and such gases can be bled from the section 51. The feed water is then conducted down the evaporating fins 38 as described hereinbefore.

A feed water jacket 75 is provided within the still housing surrounding the shells and in heat transfer relationship with the outermost of the condensing fins 39 in order to extract heat from the condensing fins for further preheating of the feed water and to obtain benefit of condensing distillate of final stage without use of electrical energy. Thus, the feed water enters the still housing through inlet line 67 (FIGURE 4), passes through the feed water jacket 75 and from the jacket through feed water inlet line 64.

Referring now to FIGURE 1, a flow sheet of the presently preferred embodiment of the present invention is shown and a discussion of operation will serve to describe the various elements contained in the overall system. The operation of the apparatus is commenced by charging it first with deionized water charge and after reaching steady state temperature conditions introduce feed water from a source 70 which supplies the feed typically at a temperature of approximately 60° F. The feed water is conducted through a first heat exchanger 71 of the type well known to the art for preheating by effluent as described hereinafter. The feed passes through a second preheating heat exchanger 72 for preheating by distillate. A three way valve 73 controls routing of the feed and is at this time of starting up in full by-pass position. A feed pump 74 maintains circulation throughout the system. At full by-pass the deionized water charge is conducted through the valve 73, through by-pass line 55. The heat stabilizer section 52 is put into operation by supplying power to the resistance heating elements 69 therein and the compressor 81 is operated to pressurize the system. The exhaust valve 82 is a bleeder valve and is set at the pressure to be maintained in the diffusion still A.

At a predetermined temperature below desired still pressure, a pressure switch (not shown) is activated to supply power to the resistance heating elements 15 in the starting column 14 to commence heating of the first shell of thermo-elements to the temperature at which water vapor will be diffused from the thin film of feed water flowing over the evaporative fins. At that point the three-way valve 73 is moved to the open position at which feed water is caused to flow in input line 84 to line filter 85A and then to the condenser 85. The feed water then passes through the low temperature jacket of condenser 85 for further preheating by higher temperature fluids as described hereinafter. The feed then passes through inlet line 88 to the final preheating jacket 75 surrounding the final stage of the concentric diffusion stages in the still housing after which it passes into the still through line 64 as described hereinbefore.

When the desired pressure is reached within the still, a bleeder valve 82 opens and serves as a back pressure control. Inert gas bleeds from the chamber through gas line 72 into the flash tank 95 to automatically maintain the desired pressure in the system. The flash tank 95 serves as the pressure disengaging point of the system in the manner well known to the art. The air compressor is cycled by means well known to the art to maintain chamber pressure.

At this time electric power is supplied to all thermo-element stages and the still is at a typical pressure of 500 p.s.i.a., for example, with feed water flowing over the evaporating fins diffusion commences and condensation of distillate on the condensing surfaces occurs. At this point the diffusion chamber temperature is above 300° F. and ΔT is approximately 8° F. It should be noted that a substantially greater temperature differential is necessary between the thermo-element hot and cold junctions to obtain 8° F. as ΔT between evaporating feed and condensing vapor distillate. This is due primarily to thermo-element junction losses, boiling point rise effect between incoming feed and outgoing effluent, and heat transfer temperature driving force between evaporating feed and the hot fins on one side and condensing vapor and cold fins on the other side of the diffusion annulus. At higher temperature levels the corresponding difference in equilibrium water vapor pressure between evaporating feed and distillate for a fixed ΔT of 8° F. is greater than at a lower temperature level. For example, while 8° F. can produce a water vapor differential of 29.3 p.s.i. between feed and distillate when feed and distillate temperatures are 456° F. and 464° F. respectively, at corresponding temperatures of 212° F. and 220° F. the water vapor differential would be 2.5 p.s.i. or approximately $\frac{1}{10}$. Since the rate of mass transfer of water across the diffusion gap varies directly with this pressure differential, high operating temperature levels are desirable since higher coefficients of performance of the thermo-electric heat pump are possible with lower ΔT. Upon stabilization at this point power is supplied to the thermo-elements 40 to raise evaporating and condensing surfaces to the desired temperature.

The heat stabilizer section operates as described hereinbefore to maintain constant feed water temperature and evaporation and condensation commences. The concentrated effluent conducted from the still through outlet line 96 flashes at the reduced pressure of the flash tank 95. The hot effluent then passes from the flash tank 95 through line 98 to the high temperature side of the heat exchanger 71. The hot distillate is conducted through high temperature line 62 to a pressure reduction valve 63 where the hot distillate flashes to vapor in passing from the high pressure to the low pressure side of the system. The vapor then passes to the high temperature side of the condenser 85 where it is condensed while preheating the incoming feed. Similarly the vapor which has flashed in the flash tank 95 passes through line 62a and into condenser 85. The hot condensate passes through a condensate trap 99 to the heat exchanger 72 and out of the system through outlet line 100.

From the heat exchanger 71 the effluent prior to passing from the system passes through a preheater-descaler unit designated generally as 105 in FIGURE 1. As discussed hereinbefore a primary problem with prior art distillation systems has been scaling due to formation of mineral deposits. Scale in the distillation of sea water results from the following reactions:

$$2HCO_3^{-1} + CO_3^{-2} = CO_2 + H_2O \qquad (1)$$

$$Ca^{+2} + CO_3^{-2} = CaCO_3 \qquad (2)$$

$$H_2O + CO_3^{-2} = 2OH^- + CO_2 \qquad (3)$$

$$Mg^{+2} + 2(HO^-) = Mg(OH)_2 \qquad (4)$$

$$Ca^{+2} + SO_4^{-2} = CaSO_4 \qquad (5)$$

From Equations 1 through 5 above, it can be seen that the formation of $Mg(OH)_2$ or $CaCO_3$ scale depends upon the release of $CO_2$. In the apparatus of the present invention the system is pressurized so that $CO_2$ cannot escape and apperciable carbonate scale will not form. The effect of salts with inverted solubilities is illustrated in Equation 5. An increase in temperature of solutions containing calcium sulfate tends to decrease its solubility and favor scale formation. As a rough indication of the calcium sulfate temperature concentration relation while below 185° F., sea water can be concentrated to four times its normal strength without formation of sulfate scale. At 300° F. substantially no concentrating can be done without the risk of scale formation.

In prior art devices the amount of distillate formed is proportional to the amount of heat passing through the heating surface. The thin film of sea water immediately adjacent to the wall of a heat transfer surface is hotter than the rest of the solution and, therefore, calcium sulfate will be deposited on this layer rather than in the body of the solution. Consequently, anhydrous calcium sulfate separates out on the heat transfer surfaces significantly decreasing the heat transfer rate. When operating above its solubility level calcium sulfate scale precipitates almost immediately after the evaporating surface is put into operation, and continues at a rapid rate directly proportional to operating temperature level requiring frequent shutdowns for cleaning of heat transfer surfaces.

The apparatus of the present invention permits operation at higher evaporative and condensing temperatures by eliminating the scaling problems in the following manner. By operating the diffusion section at pressure levels in excess of boiling atmospheric and with controlled degassing in the diffusion still A, the formation of carbon dioxide is supressed and the bicarbonate ion is not allowed to break down to form the carbonate ion which sequentially operates to produce calcium carbonate directly and to produce magnesium hydroxide indirectly through intermediate reactions. The elimination of calcium sulfate scaling on finned evaporating surfaces of the diffusion section is achieved by the presently preferred embodiment of the present invention by preferentially causing calcium sulfate to precipitate out on heat transfer surfaces of the regenerative type preheater-descaler 105 through which the feed water is conducted prior to entering the still section through line 88 after passing from the preheaters 71, 72 and 85. The preheater-descaler includes two heat exchangers arranged in parallel and designated as 106 and 107. Valves 108 and 109 which are four-way diverting valves determine the routing through the preheater-descaler.

In the preheater-descaler 105 mixed raw feed and recycle feed solution is heated to within approximately 50° F. of the predetermined condensing temperature. The preheater-descaler heat transfer surfaces are arranged for intimate contact with the solution and are electrically heated by internally placed electrodes. After sufficient scale is deposited to a point where preheating capabilities are limited, switching valves 108 and 109 automatically switch the diffusion still feed to an alternate clean preheater-descaler unit so that further descaling and preheating operations can continue without interruption. Simultaneous with the automatic switch-over from the fully loaded unit to the alternate clean unit the electrically heated surfaces of the loaded unit are deactivated and concentrated effluent previously used to clean the alternate preheater-descaler is switched to the fully scaled unit. As heat transfer surfaces cool, the scale separates during thermal contraction from metal surfaces. The concentrated effluent is cooled to its optimum solubility point for dissolving of calcium sulfate scale by heat exchange with incoming raw feed and has essentially no calcium sulfate content due to the removal of calcium sulfate achieved during the first part of the preheater-descaler operating cycle.

When equilibrium is reached between "the softening" ability of the preheater-descaler to precipitate calcium sulfate during the preheat portion of the operating cycle and the scale removal ability of the concentrated effluent during the descaling portion of the operating cycle, the ratio of calcium ions to total ions in the concentrated effluent equals the ionic ratio in the incoming raw feed. Flows are balanced accordingly and the amount of calcium sulfate scale removed from the deenergized preheater-descaler heat transfer surfaces by means of the concentrated effluent is equal to that simultaneously removed from the incoming raw feed water by the operating alternate preheater-descaler unit.

From a thermodynamic viewpoint energy may be supplied to the process described in the present invention both as heat and as work. For the transfer of energy as heat, differences in temperatures are necessary while work includes all those forms of energy in transit which are quantitatively and completely interconvertible. The interaction of energy supplied as work, e.g., pumps, and that supplied as heat, e.g., preheaters, in each of the unit operations described permits optimizing the recovery of input energy per pound of distillate produced. The figure of merit (Z) which is the measure of efficiency of a thermoelectric device represents the most important combination of parameters for a thermoelectric material. The higher the value of "Z," the lower the energy input necessary to pass one B.t.u. between predetermined hot and cold junction temperature levels. Materials of Z equal to $3\times10^{-3}/°$ C. are now commercially available and a concerted effort is being made among leading material producers to develop semi-conductors which exhibit several times currently available Z values.

In addition to improvements in Z value, increasing the level of temperature exchange while maintaining a fixed temperature differential between diffusion still, evaporative and condensing surfaces significantly reduces thermoelement energy input requirements. By allowing the diffusion chamber of the thermoelectric diffusion still to operate at temperatures above 300° F., the net effect of a material of higher Z value operating at lower conventional temperature levels is achieved.

The final condensing stage of the diffusion section requires no heat pump work for evaporation since it utilizes the heat rejection of the next-to-last condensing stage for evaporation of vapor which is in turn condensed by incoming feed. Due to the configuration of the diffusion section, the surface area of the final stage of a multistage unit often represents a sizeable proportion of the total available and thus the "free heat" associated with the last stage may have a considerable effect on reducing the kw./1000 gallons distillate produced. For example, a (6) six stage diffusion still operating on sea water feed at 500 p.s.i.a. with thermoelements of Z value equal to $3\times10^{-3}/°$ C. will require an estimated input to the thermo elements of the diffusion section of approximately 74 kw./1000 gallons distillate. For this case approximately 46% of the total distillate produced is generated in the sixth or final stage.

Under the same operating conditions and provided the Z value were increased to $5\times10^{-3}/°$ C., comparable input energy requirements would reduce some 27% to 54 kw./1000 gallons distillate. The distillate produced in the final or sixth stage would represent approximately 39% of the total produced or some 16% below that for a Z equal to $3\times10^{-3}/°$ C. Some of the advantage gained by increasing the diffusion still coefficient of performance through higher Z values is partially offset by a lower proportion of distillate formed in the final state. This is due to the lower value of input work necessary to pass heat between hot and cold junction, one-half of which ends up as heat rejected in the next to last stage. Notwithstanding as materials of higher Z values become available energy requirements will decrease accordingly to provide an operating system whose thermodynamic capabilities far exceed presently available distillation methods.

What is claimed is:

1. Distillation apparatus for separating lighter fraction distillate from a feed fluid comprising:
    a thermo-electric diffusion still including a concentric series of sections, which sections are spaced to define annular spaces between an evaporating outer surface of one section and the juxtaposed condensing inner surface of the next outwardly adjacent section, said inner surface over substantially its entire area being closer to substantially the entire area of said outer surface than any other surface in said apparatus and less than one-half the height of said sections;
    a series of thermo-electric elements positioned within such sections between the inner and outer walls thereof;
    means for conducting feed fluid as a liquid film to the evaporating surface of each of said sections;
    means for collecting condensate from the opposite condensing surface of each of said sections, said thermo-electric elements within said sections being so constructed and arranged as to maintain a temperature differential between the evaporating and condensing surfaces thereof;
    said condensing surface being lower in temperature than said evaporating surface; and
    means for maintaining said spaces between said sections at a predetermined positive pressure of approximately atmospheric and above.

2. Distillation apparatus for separating lighter fraction distillate from a feed fluid comprising:
    a thermo-electric diffusion still including a concentric series of cylindrical sections having an inner and outer cylindrical wall, which sections are closely spaced to define a series of annular diffusion spaces between said evaporating outer surface of one section and the said juxtaposed condensing inner surface of the next outwardly adjacent section, said inner surface over substantially its entire area of said outer surface than any other surface in said apparatus and less than one-half the height of said section;

a series of thermo-electric elements positioned within such sections;

means for conducting feed fluid as a liquid film to the outer surface of each of said sections in the space between said section and the next adjacent section;

means for collecting condensate from the inner surface of each of said sections, said thermo-electric elements within said sections being so constructed and arranged as to maintain a temperature differential between the inner and outer surfaces thereof;

said inner surface being lower in temperature than said outer surface, said temperature differential being $\Delta T$; and means for maintaining said sections and the spaces therebetween at a predetermined positive pressure, approximately atmospheric and above, said pressure $\Delta T$, and space being interdependent such that vapor diffusion occurs between said outer evaporating and inner condensing surfaces.

3. Distillation apparatus for separating lighter fraction distillate from a feed fluid comprising:

a thermo-electric diffusion still including a series of concentric sections having an inner wall and an outer wall, which sections are closely spaced to form annular diffusion spaces between said evaporating outer surface of one section and the said juxtaposed condensing inner surface of the next outwardly adjacent section, said inner surface over substantially its entire area of said outer surface than any other surface in said apparatus and less than one-half the height of said section;

a series of thermo-electric elements positioned within such sections, said thermo-electric elements within each of said sections being so constructed and arranged as to maintain the outer wall of each section at a temperature higher than the inner wall thereof such that a temperature differential $\Delta T$ exists between the outer wall of one section and the inner wall of the next outwardly adjacent concentric section;

means for conducting feed as a liquid film fluid in each of said annular spaces to the high temperature surface of each of said sections;

means for collecting condensate in each of said diffusion spaces from the low temperature surface of each of said sections;

means for maintaining said sections and the annular spaces therebetween at a predetermined pressure approximately atmospheric and above;

said higher temperature being below the boiling point of the feed fluid at said predetermined pressure; and means for preheating said feed fluid conducted to the spaces between adjacent sections and means for conducting effluent fluid and distillate from said spaces.

4. Distillation apparatus for separating lighter fraction distillate from a feed fluid comprising:

a thermo-electric diffusion still including a series of concentric sections having an inner wall and an outer wall, which sections are closely spaced to form annular diffusion spaces between said evaporating outer surface of one section and the said juxtaposed condensing inner surface of the next outwardly adjacent section, said inner surface over substantially its entire area of said outer surface than any other surface in said apparatus and less than one-half the height of said section;

a series of thermo-electric elements positioned within such sections, said thermo-electric elements within each of said sections being so constructed and arranged as to maintain the outer wall of each section at a temperature higher than the inner wall thereof such that a temperature differential $\Delta T$ exists between the outer wall of one section and the inner wall of the next outwardly adjacent concentric section, said thermo-electric elements providing a thermo-electric heat pump from the first concentric section relative to the axis of the diffusion still in series outwardly radially to the most distant section from said axis;

means for conducting feed fluid as a liquid film in each of said annular spaces to the high temperature surface of each of said diffusion spaces;

means for collecting condensate in each of said diffusion spaces from the low temperature surface of each of said spaces;

means for maintaining said sections and the annular spaces therebetween at a predetermined pressure;

said higher temperature being below the boiling point of the feed fluid at said predetermined pressure; and means for preheating said feed fluid conducted to the spaces between adjacent sections and means for conducting effluent fluid and distillate from said spaces.

5. Distillation apparatus for separating lighter fraction distillate from a feed fluid comprising:

a thermo-electric diffusion still including a series of concentric sections having an inner wall and an outer wall, which sections are closely spaced to form annular diffusion spaces between said evaporating outer surface of one section and the said juxtaposed condensing inner surface of the next outwardly adjacent section, said inner surface over substantially its entire area of said outer surface than any other surface in said apparatus and less than one-half the height of said section;

a series of thermo-electric elements positioned within such sections, said thermo-electric elements within each of said sections being so constructed and arranged as to maintain the outer wall of each section at a temperature higher than the inner wall thereof such that a temperature differential $\Delta T$ exists between the outer wall of one section and the inner wall of the next outwardly adjacent concentric section;

means for conducting feed fluid in each of said annular spaces as a liquid film to the high temperature surface of each of said sections;

means for collecting condensate in each of said diffusion spaces from the low temperature surface of each of said sections;

means for maintaining said sections and the annular spaces therebetween at a predetermined pressure;

said higher temperature being below the boiling point of the feed fluid at said predetermined pressure and in excess of approximately 300° F.; and means for preheating said feed fluid conducted to the spaces between adjacent sections and means for conducting effluent fluid and distillate from said spaces.

6. Distillation apparatus for separating lighter fraction distillate from a feed fluid comprising:

a thermo-electric diffusion still including a series of concentric sections having an inner wall and an outer wall, which sections are closely spaced to form annular diffusion spaces between said evaporating outer surface of one section and the said juxtaposed condensing inner surface of the next outwardly adjacent section, said inner surface over substantially its entire area of said outer surface than any other surface in said apparatus and less than one-half the height of said section;

a series of thermo-electric elements positioned within such sections, said thermo-electric elements within each of said sections being so constructed and arranged as to maintain the outer wall of each section at a temperature higher than the inner wall thereof such that a temperature differential $\Delta T$ exists between the outer wall of one section and the inner wall of the next outwardly adjacent concentric section, said thermo-electric elements providing a thermo-electric heat pump from the first concentric section relative to the axis of the diffusion still in series outwardly radially to the most distant section from the axis;

means for conducting feed fluid as a liquid film to the high temperature surface of each of said diffusion spaces;

means for collecting condensate in each of said diffusion spaces from the low temperature surface of each of said spaces;

means for maintaining said sections and the annular spaces therebetween at a predetermined pressure;

said higher temperature being below the boiling point of the feed fluid at said predetermined pressure and in excess of approximately 300° F.; and means for preheating said feed fluid conducted to the spaces between adjacent sections and means for conducting effluent fluid and distillate from said spaces.

7. Apparatus as defined in claim 5 in which a first plurality of heat conducting fins are affixed to the inner wall of each section and extend radially into said diffusion space as condensing fins and a second plurality of heat conducting fins affixed to the outer wall of each section to act as evaporating fins, said first plurality and said second plurality being radially interleaved and closely spaced to define the diffusion gap.

8. Apparatus as defined in claim 6 in which a first plurality of heat conducting fins are affixed to the inner wall of each section and extend radially into said diffusion space as condensing fins and a second plurality of heat conducting fins affixed to the outer wall of each section to act as evaporating fins, said first plurality and said second plurality being radially interleaved and closely spaced to define the diffusion gap, and said second plurality of evaporating fins being adapted to conduct a film of feed fluid from the upper ends thereof downwardly into the still.

9. Distillation apparatus for separating distillate from feed water comprising:

a thermo-electric diffusion still, said still including a housing, means for maintaining said housing at a predetermined pressure above ambient, a heat stabilizing section within said housing;

a heat stabilizing section in said housing, means for preheating and conducting said feed water to said heat stabilizing section;

said diffusion still including a series of concentric sections having an inner wall and an outer wall, which sections are closely spaced to form annular diffusion spaces therebetween;

a series of thermo-electric elements positioned within such sections, said thermo-electric elements within each of said sections being so constructed and arranged as to maintain the outer wall of each section at a temperature higher than the inner wall thereof such that a temperature differential $\Delta T$ exists between the outer wall of one section and the inner wall of the next outwardly adjacent concentric section, said thermo-electric elements providing a thermo-electric heat pump from the first concentric section relative to the axis of the diffusion still in series outwardly radially to the most distant section from the axis;

means for conducting feed water from said heat stabilizing section to the high temperature surface of each of said diffusion spaces, means for passing said feed water in film flow along said high temperature surface and means for degassing said feed water prior to conducting it to the high temperature surface;

means for collecting condensate in each of said diffusion spaces from the low temperature surface of each of said spaces;

said temperature of said high temperature surfaces being below the boiling point of said feed water at said predetermined pressure and in excess of approximately 300° F.; and means for conducting effluent and distillate from said spaces and said apparatus.

10. Apparatus as defined in claim 9 in which a first plurality of heat conducting fins are affixed to the inner wall of each section and extend radially into said diffusion space as condensing fins and a second plurality of heat conducting fins affixed to the outer wall of each section to act as evaporating fins, said first plurality and said second plurality being radially interleaved and closely spaced to define the diffusion gap.

11. Apparatus as defined in claim 10 which also includes means for separating scale producing components from said feed water conducted to said still.

12. Apparatus as defined in claim 10 in which said distillate from said spaces is conducted through the axial portion (14) of said concentric sections to preheat said heat pump.

13. Apparatus as defined in claim 11 in which said means for separating scale producing components includes parallel descaler units, means for selectively alternately routing feed water through said descaler units, means for preheating said feed water in each of said descaler units.

14. Distillation apparatus for separating lighter fraction distillate from a feed fluid comprising:

a thermo-electric diffusion still including a series of concentric sections, which sections are spaced to define annular spaces between an evaporating outer surface of one section and the juxtaposed condensing inner surface of the next outwardly adjacent section, said inner surface over substantially its entire area being closer to substantially the entire area of said outer surface than any other surface in said apparatus and less than one-half the height of said section such that mass transfer of liquid molecules can occur by diffusion from one section to an adjacent section;

means for conducting feed fluid as a liquid film to the outer surface of each of said sections;

a series of thermo-electric elements positioned within such sections, said thermo-electric elements within said sections being so constructed and arranged as to maintain a temperature differential between the inner and outer surfaces thereof, said inner surface being lower in temperature than said outer surface;

said outer surface of one section and the inner surface of the next outwardly adjacent concentric section having a temperature differential such that a condensate of the feed fluid is formed on the inner surface of each of said sections;

means for collecting condensate from the inner surface of each of said sections;

means for maintaining said sections and the spaces therebetween at a predetermined positive pressure of atmospheric and above, and means for conducting distillate from the inner surface of said sections; and means for preheating said feed fluid conducted to the spaces between adjacent sections and means for conducting affluent fluid and distillate from said spaces.

15. The apparatus as defined in claim 8 wherein said fins are perforated.

16. Distillation apparatus for separating lighter fraction distillate from a feed fluid comprising:

a thermo-electric diffusion still including a series of endless walled sections, which sections are spaced to define endless spaces between an outer evaporating surface of one section and the juxtaposed condensing inner surface of the next adjacent section, said inner surface over substantially its entire area being closer to substantially the entire area of said outer surface than any other surface in said apparatus and less than one-half the height of said sections;

a series of thermo-electric elements positioned within such sections between the inner and outer walls thereof;

means for conducting feed fluid as a liquid film to the evaporating surface of each of said sections;

means for collecting condensate from the opposite condensing surface of each of said sections, said thermo-electric elements within said sections being so constructed and arranged as to maintain a temperature differential between the evaporating and condensing surfaces thereof;

said condensing surface being lower in temperature than said evaporating surface; and means for maintaining said spaces between said sections at a predetermined positive pressure of approximately atmospheric and above.

References Cited
UNITED STATES PATENTS

| | | | |
|---|---|---|---|
| 2,159,303 | 6/1939 | Waterman et al. | 203—72 X |
| 2,876,833 | 3/1959 | Kelley et al. | 159—4 |
| 2,899,366 | 8/1959 | Hickman | 202—205 |
| 2,971,897 | 2/1961 | Chapman. | |
| 3,212,999 | 10/1965 | Sommers | 62—3 X |

FOREIGN PATENTS 855,458  11/1960  Great Britain.

NORMAN YUDKOFF, *Primary Examiner.*

WILBUR L. BASCOMB, JR., *Examiner.*

D. EDWARDS, *Assistant Examiner.*

UNITED STATES PATENT OFFICE
CERTIFICATE OF CORRECTION

Patent No. 3,393,130

July 16, 1968

Milton Meckler

It is certified that error appears in the above identified patent and that said Letters Patent are hereby corrected as shown below:

Column 4, line 24, "inventinon" should read -- invention --. Column 10, line 28, "$2HCO_3^{-1} + CO_3^{-2} = CO_2 + H_2O$" should read -- $2HCO_3^{-1} = CO_3^{-2} + CO_2 + H_2O$ --; line 33, "$Mg^{+2} + 2(HO^-) = Mg(OH)^2$" should read -- $Mg^{+2} + 2(OH^-) = Mg(OH)2$ --; line 40, "apperciable" should read -- appreciable --. Column 11, line 15, "condensing" should read -- evaporating --. Column 12, line 13, "kw./1000" should read -- kwh./1000 --; line 18, "74kw./1000" should read -- 74kwh./1000 --; line 24, "kw./1000" should read -- kwh./1000 --.

Signed and sealed this 9th day of June 1970.

(SEAL)
Attest:

Edward M. Fletcher, Jr.
Attesting Officer

WILLIAM E. SCHUYLER, JR.
Commissioner of Patents